(12) United States Patent
Tamai

(10) Patent No.: US 10,776,911 B2
(45) Date of Patent: Sep. 15, 2020

(54) INFORMATION PROCESSING APPARATUS, IDENTIFICATION SYSTEM, SETTING METHOD, AND PROGRAM

(71) Applicant: OMRON Corporation, Kyoto-shi, Kyoto (JP)

(72) Inventor: Toshinori Tamai, Nara (JP)

(73) Assignee: OMRON Corporation, Kyoto-shi (JP)

( * ) Notice: Subject to any disclaimer, the term of this patent is extended or adjusted under 35 U.S.C. 154(b) by 66 days.

(21) Appl. No.: 16/162,456

(22) Filed: Oct. 17, 2018

(65) Prior Publication Data

US 2019/0188846 A1 Jun. 20, 2019

(30) Foreign Application Priority Data

Dec. 14, 2017 (JP) .................................. 2017-239570

(51) Int. Cl.
*G06T 7/00* (2017.01)
*G06K 9/62* (2006.01)
(Continued)

(52) U.S. Cl.
CPC ............ *G06T 7/0008* (2013.01); *G06F 17/18* (2013.01); *G06K 9/627* (2013.01); *G06K 9/6227* (2013.01);
(Continued)

(58) Field of Classification Search
CPC ......... G06T 7/0008; G06T 2207/20081; G06T 2207/30164; G06T 2207/20084;
(Continued)

(56) References Cited

U.S. PATENT DOCUMENTS 10,185,892 B1 *   1/2019   Mishra ................. G06K 9/6256
2008/0075352 A1   3/2008   Shibuya et al.
(Continued)

FOREIGN PATENT DOCUMENTS

JP    2016-55188 A    4/2016

OTHER PUBLICATIONS

Song et al. 'Automatic recommendation of classification algorithms based on data set characteristics', Pattern Recognition, Elsevier, GB, vol. 45, No. 7; Published Dec. 21, 2011, pp. 2672-2689.*
(Continued)

*Primary Examiner* — Neil R McLean
(74) *Attorney, Agent, or Firm* — Metrolex IP Law Group, PLLC

(57) ABSTRACT

An information processing apparatus may include: a storage unit configured to store a plurality of classifiers that identify an object, the classifiers having different characteristics; a measurement unit configured to measure identification accuracy and execution time of each of the plurality of classifiers for a specific object; an output unit configured to output the identification accuracy and the execution time of each of the plurality of classifiers; a selection unit configured to select, from the classifiers whose identification accuracy measured by the measurement unit meets a first condition, a classifier whose execution time meets a second condition; and a setting unit configured to perform setting to cause the selected classifier to operate on an identification apparatus.

17 Claims, 17 Drawing Sheets

(51) Int. Cl.
*G06F 17/18* (2006.01)
*G06N 20/00* (2019.01)
*G06N 3/08* (2006.01)
*G06N 3/04* (2006.01)

(52) U.S. Cl.
CPC ......... *G06K 9/6254* (2013.01); *G06K 9/6255* (2013.01); *G06K 9/6256* (2013.01); *G06N 3/04* (2013.01); *G06N 3/08* (2013.01); *G06N 20/00* (2019.01); *G06K 2209/19* (2013.01); *G06T 2207/20081* (2013.01); *G06T 2207/30164* (2013.01)

(58) Field of Classification Search
CPC .. G06T 2207/10004; G06N 3/04; G06N 3/08; G06N 20/00; G06K 9/6227; G06K 9/6255; G06K 9/6254; G06K 9/6256; G06K 9/627; G06K 2209/19; G06K 9/6274; G06F 17/18
See application file for complete search history.

(56) References Cited

U.S. PATENT DOCUMENTS

| | | | |
|---|---|---|---|
| 2013/0202189 A1* | 8/2013 | Shibuya | G01N 21/9501 382/149 |
| 2016/0061745 A1* | 3/2016 | Chen | G01N 21/9501 356/237.5 |
| 2016/0163035 A1* | 6/2016 | Chang | G06T 7/0004 382/149 |
| 2016/0173868 A1 | 6/2016 | Shen | |
| 2016/0358041 A1 | 12/2016 | Venkataraman et al. | |

OTHER PUBLICATIONS

The extended European search report dated Jul. 25, 2019 in a counterpart European patent application.

Qinbao Song et al, "Automatic recommendation of classification algorithms based on data set characteristics", Pattern Recognition, Dec. 27, 2011 (retrieved on Jan. 11, 2012), pp. 2672-2689, vol. 45, No. 7, Elsevier, GB, Relevance is indicated in the ESR of Apr. 23, 2019.

Christophe Giraud-Carrier, "The Data Mining Advisor: Meta-learning at the Service of Practitioners", Proceedings of the Fourth International Conference on Machine Learning and Applications, Los Angeles, CA, USA, Dec. 15-17, 2005, pp. 113-119, IEEE, Piscataway, NJ, USA, Relevance is indicated in the ESR of Apr. 23, 2019.

A partial European search report dated Apr. 23, 2019 in a counterpart European Patent Application.

* cited by examiner

FIG. 9

*Basic Defect Setting (2001)*

☐ Defective Item Flaw
Depth (max) : auto
(min) : 10 um
Length (max) : auto
(min) : 1 mm
Location (x) : auto
(y) : auto
Color Tone : auto ☐ Defective Item Smudge
.....

☐ Defective Item Bruise
.....

No. of Defective Item Test Images
To Generate: 10

*Test Images (2002)*

☐ Defective Item Test Images

FIG. 11

| Type | Computational Accuracy | Neuron Deletion |
|---|---|---|
| 1 | Binary-Type/INT2 | None |
| 2 | | Minor: Deletion of 70% or Less |
| 3 | | Major: Deletion of 70% or More |
| 4 | Integral-Type/INT8 | None |
| 5 | | Minor: Deletion of 70% or Less |
| 6 | | Major: Deletion of 70% or More |
| 7 | Floating Point-Type/float | None |
| 8 | | Minor: Deletion of 70% or Less |
| 9 | | Major: Deletion of 70% or More |
| 10 | Floating Point-Type/double | None |
| 11 | | Minor: Deletion of 70% or Less |
| 12 | | Major: Deletion of 70% or More |
| ... | ... | ... |

FIG. 17

| Material of Object | Surface Texture | Detection Item | Detection Size |
|---|---|---|---|
| Metal | Shiny | Flaw | Maximum Depth of 100 μm |
| | | | Minimum Depth of 100 μm |
| | | Smudge | 1 m² or Less |
| | | Uneven Color | — |
| | | General Purpose | — |
| | ... | ... | |
| | Roughness | Flaw | Maximum Depth of 100 μm |
| Vinyl | Transparent | Flaw | — |

| Type | Computational Accuracy | Neuron Deletion |
|---|---|---|
| 1 | ... | ... |
| 2 | ... | ... |
| 3 | ... | ... |
| ... | ... | ... |

INFORMATION PROCESSING APPARATUS, IDENTIFICATION SYSTEM, SETTING METHOD, AND PROGRAM

CROSS-REFERENCES TO RELATED APPLICATIONS

This application claims priority to Japanese Patent Application No. 2017-239570 filed Dec. 14, 2017, the entire contents of which are incorporated herein by reference.

FIELD

The disclosure relates to an information processing apparatus, an identification system, a setting method, and a program.

BACKGROUND

It is known that if a classifier to identify whether or not image data contains an object of detection is generated by machine learning, the generated classifier generally faces a trade-off between the identification accuracy and the time required for identification.

JP 2016-55188A describes an identification apparatus that comprises a strong classifier including a plurality of weak classifiers having low identification performance, the strong classifier identifying input data based on the linear sum of the result of determination of the feature value by each weak classifier and the weight set by each weak classifier.

SUMMARY

The identification accuracy desired for an identification apparatus and the execution time required for identification may vary depending on the needs of the user. For example, different users have different needs, as there are those who attach importance to identification accuracy at a certain cost of prolonged execution time and those who attach importance to execution time over identification accuracy. Therefore, a mechanism is desired that is capable of adjusting both identification accuracy and execution time.

If both identification accuracy and execution time can be adjusted, the detection errors of the object for detection can be reduced by increasing the identification accuracy, for example, if identification accuracy is regarded more important than execution time. Alternatively, if execution time is regarded more important than identification accuracy, it is possible to keep in check the use of the CPU resources and the memory resources of the identification apparatus as a shorter time is required for identification. However, the primary object of the identification apparatus described in JP 2016-55188A is to increase the speed of detection but does not contemplate adjustment of both identification accuracy and execution time in the first place.

In view of the above, one or more aspects may provide a classifier capable of adjusting both of the identification accuracy and the execution time required for identification.

Means to Solve the Problem

An information processing apparatus according to an aspect of the present disclosure comprises: a storage unit (such as a memory, non-volatile memory, read only memory (ROM), flash memory, Hard Drive Disk (HDD), Solid State Drive (SSD), volatile memory, Random Access Memory (RAM), etc.) configured to store a plurality of classifiers that identify an object, the classifiers having different characteristics; a measurement unit configured to measure identification accuracy and execution time of each of the plurality of classifiers for a specific object; a processor (such as a central processing unit (CPU), field programmable gate array (FGPA), digital signal processor (DSP), graphical processing unit (GPU), application specific integrated circuit (AISC), an integrated circuit, etc.) configured with a program to perform operations as units of the information processing apparatus, an output unit configured to output the identification accuracy and the execution time of each of the plurality of classifiers; a selection unit configured to select a classifier whose execution time meets a second condition from the classifiers whose identification accuracy measured by the measurement unit meets a first condition; and a setting unit configured to perform setting to cause the selected classifier to operate on an identification apparatus.

According to an aspect, among the plurality of classifiers for object inspection whose measured identification accuracy falls within a predetermined allowable range, a classifier whose execution time meets a predetermined condition can be selected to be executed by the identification apparatus. This makes it possible to adjust both the identification accuracy and the execution time required for identification. Moreover, as the classifier whose execution time required for identification meets a predetermined condition can be selected, it is possible to keep in check wasteful consumption of the CPU resources and the memory resources.

In an aspect, the storage unit may be configured to store test images used to measure the identification accuracy and the execution time of each of the plurality of classifiers for the specific object; and the measurement unit may be configured to measure the identification accuracy and the execution time of each of the plurality of classifiers by causing each classifier to identify the test images. Furthermore, in an aspect, the storage unit may be configured to store an image of an object, and the information processing apparatus may further comprise a generation unit configured to generate the test images by receiving inputs about image editing conditions from a user and editing images of an object stored in the storage unit based on the editing conditions. According to an aspect, the user can use the test images to measure the identification accuracy and the execution time of the classifiers without preparing photographed images of an actual object.

According to an aspect, in which the generation unit may generate the test images by adding images of an object of detection specified by the user to images of an object stored in the storage unit, the user can generate test images according to the environment where the classifiers are used to allow for selection of optimum classifiers for the user.

In an aspect, the generation unit may be configured to generate the test images by adding images of an object of detection based on parameters specified by the user to images of an object stored in the storage unit. According to an aspect, the user can use test images automatically generated according to the environment where the classifiers are used to allow for selection of optimum classifiers for the user. In addition, according to an aspect, it is impossible to reduce the burden on the user to generate the test images.

In an aspect, the test images may include a plurality of first images, a correct answer about each of the first test images being that the first test image contains an object of detection; the identification accuracy may include a first probability that the respective classifier identifies an object of detection in the plurality of first test images; the measurement unit may be configured to measure the first probability by causing each of the classifiers to identify the plurality of first test images; and the selection unit may be configured to select a classifier whose execution time meets the second condition from the classifiers whose first probability measured by the measurement unit falls under the first condition. According to an aspect, as the user can evaluate the identification accuracy of the classifiers based on test images a correct answer about each of which is that the test image contains an object of detection, the user can evaluate the identification accuracy of the classifiers more closely.

In an aspect, the test images may be further configured to include a plurality of second images, a correct answer about each of the second test images being that the second test image contains no object of detection; the identification accuracy may further include a second probability that the respective classifier erroneously identifies an object of detection in the plurality of second test images; the measurement unit may be configured to measure the second probability by causing each of the classifiers to identify the plurality of second test images; and the selection unit may be configured to select a classifier whose execution time meets the second condition from the classifiers whose second probability measured by the measurement unit falls under the first condition. According to an aspect, as the user can evaluate the identification accuracy of the classifiers based on test images a correct answer about each of which is that the test image contains no object of detection, the user can more closely evaluate the identification accuracy of the classifiers.

In an aspect, the first condition may be a range of identification accuracy specified by the user using the identification apparatus. According to an aspect, the user can adjust both the identification accuracy and the execution time required for identification.

In an aspect, the selection unit may be configured to select the classifier that has the highest identification accuracy if there is no classifier whose identification accuracy measured by the measurement unit falls under the first condition. According to an aspect, even if there is no classifier whose identification accuracy reaches a predetermined level, the identification apparatus can be operated while maintaining high identification rate.

In an aspect, each of the plurality of classifiers may be designed by combining a type of learned model and a threshold value for identifying an object of detection. According to an aspect, as the number of available classifiers with different identification accuracy is equal to the number of combinations of a type of learned models and a threshold value, the user can choose from a wide selection of classifiers at the user's disposal. This makes it possible for the user to select an appropriate one from numerous classifiers.

In an aspect, the classifier whose execution time meets the second condition may be the classifier with the shortest execution time. According to an aspect, as the classifier with the shortest execution time can be selected from the classifiers whose identification accuracy falls within the allowable range, it is possible to keep in check wasteful consumption of the CPU resources and the memory resources.

In an aspect, an identification system may be provided that includes the foregoing information processing apparatus and the foregoing identification apparatus in communication with the information processing; in which the identification apparatus comprises: a receiving unit conjured to receive a classifier selected by the information processing apparatus from the information processing apparatus and storing the classifier in a storage unit; and an identifying unit configured to use a classifier stored in the storage unit to identify an object. According to an aspect, an identification system can be realized that uses a classifier selected by the information processing apparatus to identify an object.

A setting method in another aspect is a setting method performed by an information processing apparatus comprising a storage unit configured to store a plurality of classifiers that identify an object, the classifiers having different characteristics, the setting method comprising the steps of: measuring identification accuracy and execution time of each of the plurality of classifiers for a specific object; outputting the identification accuracy and the execution time of each of the plurality of classifiers; selecting a classifier whose execution time meets a second condition from the classifiers whose measured identification accuracy meets a first condition; and performing setting to cause the selected classifier to operate on an identification apparatus.

According to an aspect, among the plurality of classifiers for inspecting objects whose measured identification accuracy falls within a predetermined allowable range, a classifier whose execution time meets a predetermined condition can be selected to be executed by the identification apparatus. This makes it possible to adjust both the identification accuracy and the execution time required for identification. Moreover, as the classifier whose execution time required for identification meets a predetermined condition can be selected, it is possible to keep in check wasteful consumption of the CPU resources and the memory resources.

According to still another aspect, a program causes a computer including a storage unit (such as a memory, non-volatile memory, read only memory (ROM), flash memory, Hard Drive Disk (HDD), Solid State Drive (SSD), volatile memory, Random Access Memory (RAM), etc.) configured to store a plurality of classifiers that identify an object, the classifiers having different characteristics to perform operations as units such as: a measurement unit configured to measure identification accuracy and execution time of each of the plurality of classifiers for a specific object; an output unit configured to output the identification accuracy and the execution time of each of the plurality of classifiers; a selection unit configured to select a classifier whose execution time meets a second condition from the classifiers whose identification accuracy measured by the measurement unit meets a first condition; and a setting unit configured to perform setting to cause the selected classifier to operate on an identification apparatus.

According to an aspect, among the plurality of classifiers for inspecting objects whose measured identification accuracy falls within a predetermined allowable range, the classifier whose execution time meets a predetermined condition can be selected to be executed by the identification apparatus. This makes it possible to adjust both the identification accuracy and the execution time required for identification. Moreover, as the classifier whose execution time required for identification meets a predetermined condition can be selected, it is possible to keep in check wasteful consumption of the CPU resources and the memory resources.

Effect of the Invention

According to one or more aspects, a classifier can be provided that is capable of adjusting both identification accuracy and execution time required for identification.

BRIEF DESCRIPTION OF THE DRAWINGS

FIG. 9 is a diagram illustrating one example of a test image creation screen (automatic).

FIG. 11 is a diagram illustrating examples of various types of learned models.

FIG. 17 is a diagram illustrating examples of the types of objects of inspection identified by classifiers.

DETAILED DESCRIPTION

One or more embodiments (also referred to as "an embodiment" hereinafter) will be described hereinafter based on the drawings.

§ 1 Application Example

Figure 1:
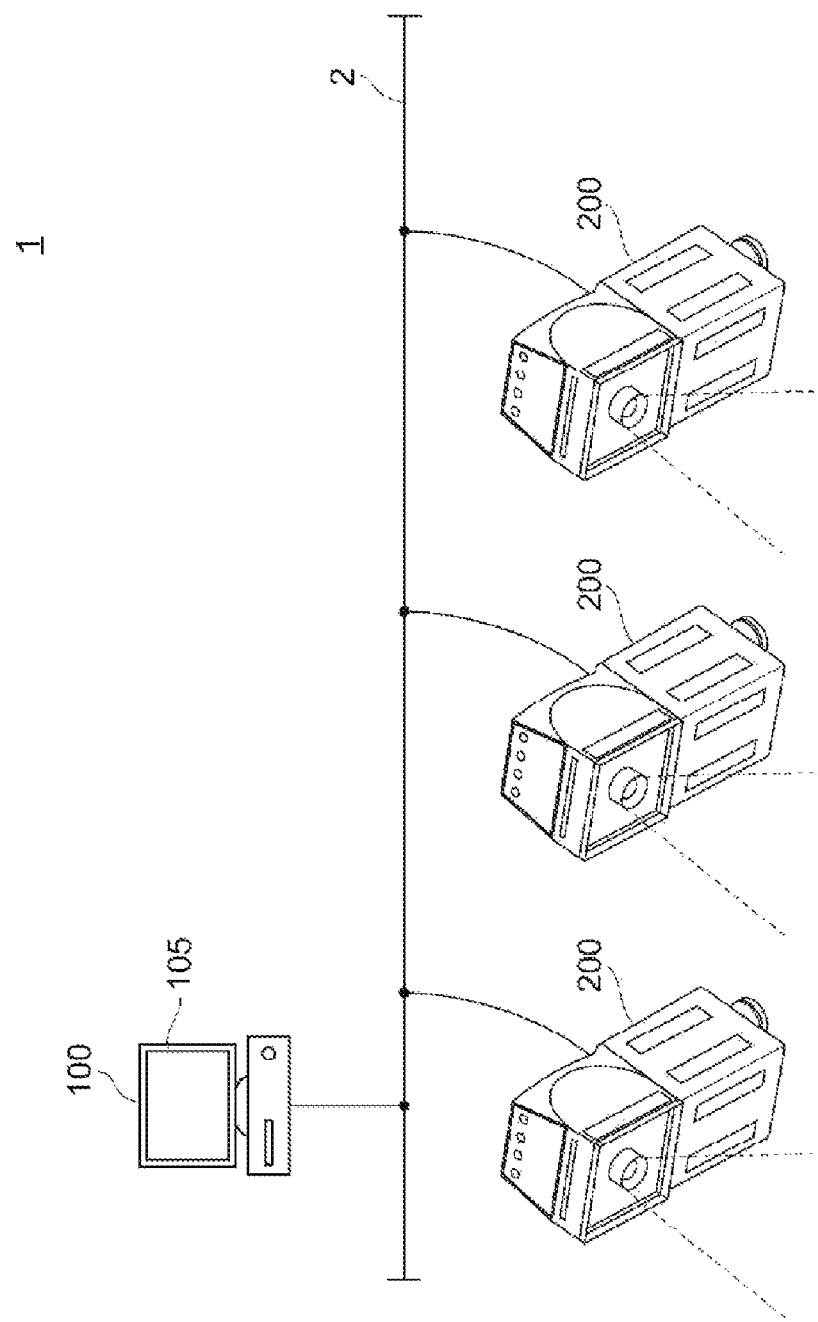
FIG. 1 is a diagram schematically illustrating one exemplary situation to which an image processing system according to an embodiment is applied.

First, one exemplary situation to which an embodiment is applied will be described with reference to FIG. 1. FIG. 1 schematically shows one exemplary situation to which an image processing system 1 according to an embodiment is applied. The image processing system 1 is typically incorporated into a production line. The image processing system 1 inspects workpieces based on images acquired by imaging the workpieces conveyed on a production line. It should be noted that the image processing system 1 is one example of an identification system of an embodiment.

As shown in FIG. 1, the image processing system 1 includes a management apparatus 100 and one or more image processing apparatuses 200 that communicate with the management apparatus 100 via a network 2. For example, workpieces are conveyed in a predetermined direction by a conveyance mechanism, such as a belt conveyor, with each of the image processing apparatuses 200 disposed at a predetermined position with respect to the conveyance route. The management apparatus 100 is provided with a plurality of classifiers with at least different characteristics to inspect workpieces and selects from these classifiers a classifier to be executed by the image processing apparatus 200. "Plurality of classifiers with different characteristics" means different classifiers that are capable of detecting the same object of detection but have different identification accuracies with which to identify the object of detection and/or different lengths of execution time required from the start of detection of the object of detection to the outputting of the result of detection (simply referred to as "execution time" hereinafter) because these classifiers have different computational accuracies and different amounts of computation for detection. A workpiece is one example of the object of inspection according to an embodiment. Additionally, the management apparatus 100 is one example of the information processing apparatus according to an embodiment. Moreover, the image processing apparatus 200 is one example of the identification apparatus according to an embodiment.

First, the management apparatus 100 generates a plurality of test images to measure the identification accuracy and the execution time of each classifier for a specific object of inspection. The specific object of inspection may be, for example, a workpiece provided with predetermined properties (e.g., the material of the workpiece, the surface texture, or a defect of the workpiece) that the user causes the image processing machine 200 to inspect. Furthermore, the test images may be images without defects to which artificial defects are added. As used herein, the term "detect" refers to an abnormality present in objects of inspection, including, for example, a flaw, uneven color, a smudge, a bruise, a chip, a burr, foreign matter, a thin print spot, and misregistration of printing. Then, the management apparatus 100 measures the identification accuracy and the execution time of each of the plurality of classifiers by causing each classifier to identify the plurality of generated test images. The identification accuracy may be represented by the probability that the classifier can successfully detect the presence or absence of the defect in each workpiece image.

Next, the management apparatus 100 selects, as the classifier to be executed by the image processing apparatus 200, a classifier whose execution time meets a predetermined condition from the classifiers whose measured identification accuracy falls within the allowable range of identification accuracy required by the user as the performance of the image processing apparatus 200. The predetermined condition may be, for example, the classifier with the shortest execution time. The selected classifier is integrated into the image processing apparatus 200, which in turn enters images of workpieces conveyed on the production line into the classifier to perform inspection of the workpieces and other tasks. The predetermined allowable range is an example of the first condition according to an embodiment. The predetermined condition is an example of the second condition according to an embodiment.

According to an embodiment, prior to the actual start of workpiece inspection on the production line, the management apparatus 100 can select a classifier whose execution time meets the predetermined condition from the classifiers that exhibit the allowable range of identification accuracy, and the management apparatus 100 can integrate the selected classifier with the image processing apparatus 200. In this way, in the image processing system 1, a classifier with appropriate identification accuracy and execution time may be selected from the plurality of classifiers, so that a classifier can be provided that meets the needs of the user.

Furthermore, according to an embodiment, as an appropriate classifier can be selected in advance by using test images, there is no need to prepare a large number of images for use on the actual production line for workpiece inspection in order to select an appropriate classifier.

§ 2 Exemplary Configurations

Hardware Configuration
Management Apparatus

Figure 2:
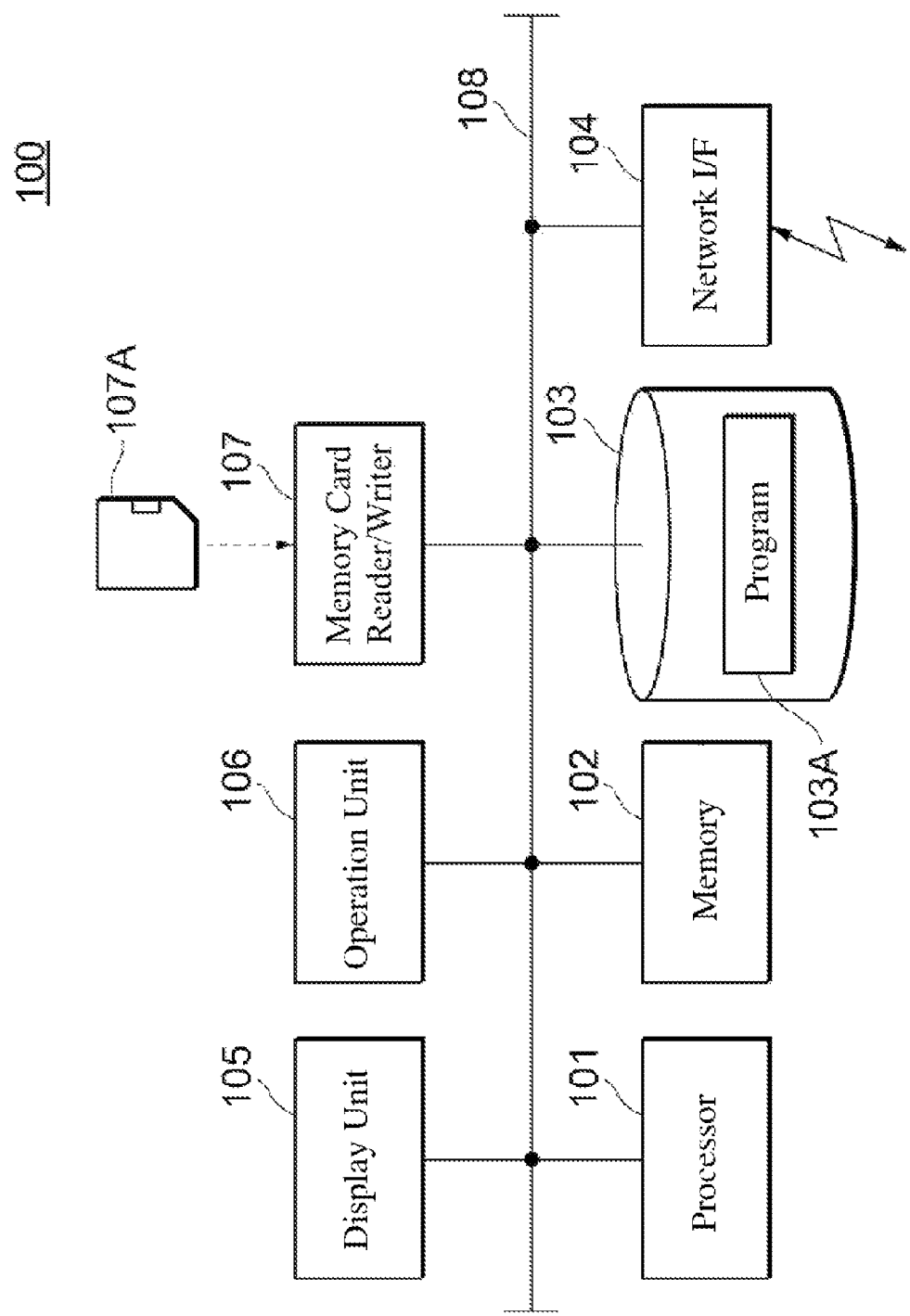
FIG. 2 is a diagram schematically illustrating one example of the hardware configuration of a management apparatus according to an embodiment.

Next, one example of the hardware configuration of the management apparatus 100 according to an embodiment will be described hereinafter with reference to FIG. 2. FIG. 2 schematically shows one example of the hardware configuration of the management apparatus 100 to according to an embodiment. In the example of FIG. 2, the management apparatus 100 may include a processor 101, a memory 102, and a storage device 103, such as an HDD (Hard Disk Drive), a network interface (I/F) 104, a display unit 105, an operation unit 106, and a memory card writer 107. These components are communicably connected to each other with an internal bus 108.

The processor 101 implements the various functions of the management apparatus 100 by deploying a program (instruction codes) 103A stored in the storage device 103 on the memory 102 and executing the program. The memory 102 and the storage device 103 store volatile and non-volatile data, respectively. The storage device 103 holds the program 103A in addition to an OS (Operating System).

The network interface 104 sends and receives data to and from the image processing apparatus 200 via the network 2.

The display unit 105 displays various screens that are generated by the processor 101 executing the program 103A. The display unit 105 is composed of a display, such as an LCD (Liquid Crystal Display), for example.

The operation unit 106 receives user operations to send internal commands that correspond to the received operations to the processor 101. The operation unit 106 is composed, for example, of a keyboard, a mouse, a touch panel, a tablet, and a voice recognition unit.

The memory card writer 107 reads and writes data to and from the storage medium 107A. The storage medium 107A accumulates information, such as the aforementioned program, through electrical, magnetic, optical, mechanical, or chemical effects, to allow apparatuses, such as a computer and other devices and machines, to read information, such as the stored program. The management apparatus 100 may obtain the program 103A from the storage medium 107A.

Image Processing Apparatus

Figure 3:
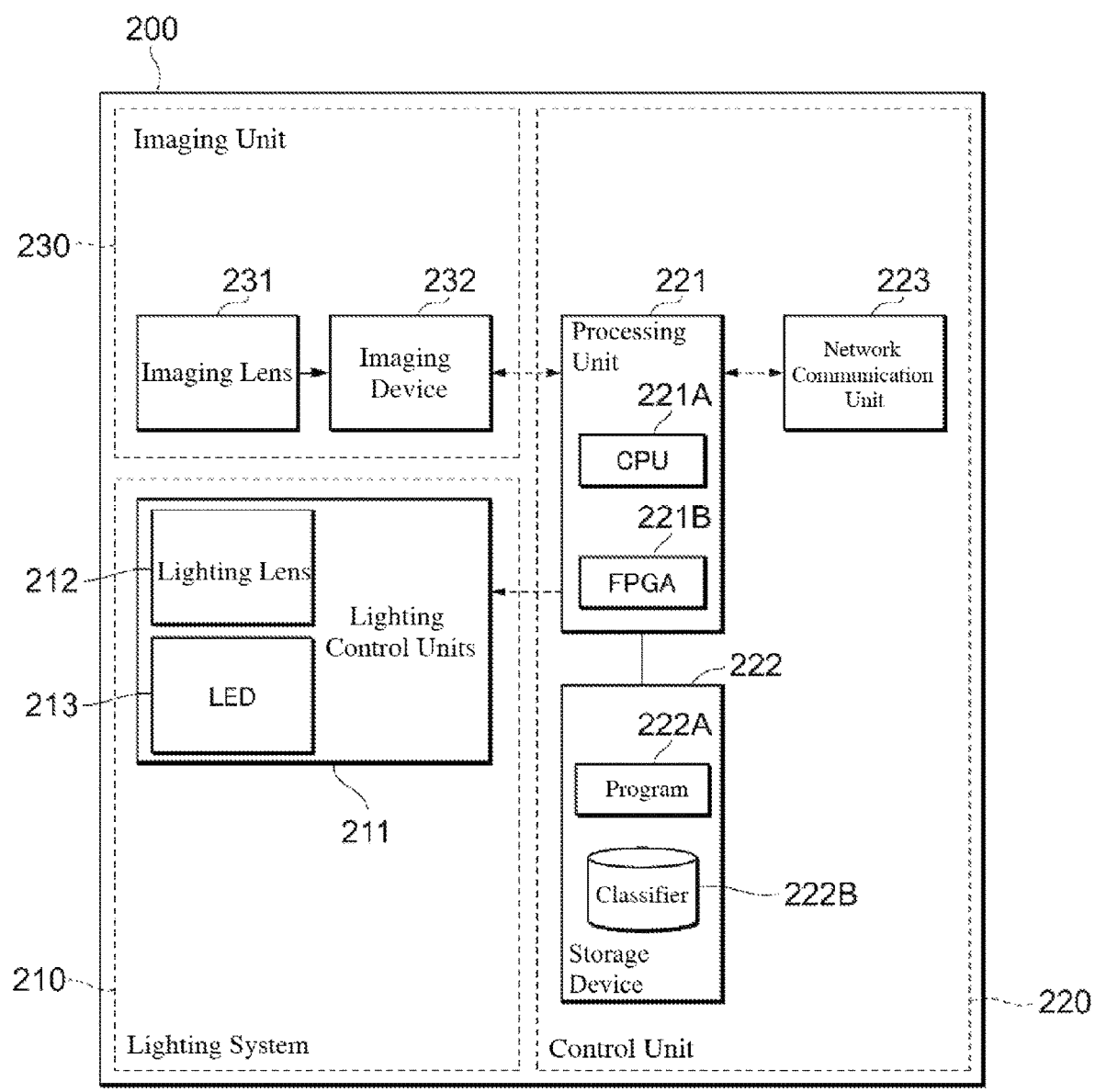
FIG. 3 is a diagram schematically illustrating one example of the hardware configuration of an image processing apparatus according to an embodiment.

Next, one example of the hardware configuration of the image processing apparatus 200 according to an embodiment will be described hereinafter with reference to FIG. 3. FIG. 3 schematically shows one example of the hardware configuration of the image processing apparatus 200 to according to an embodiment. In the example of FIG. 3, the image processing apparatus 200 may include a lighting system 210, a control unit 220, and an imaging unit 230.

The lighting system 210 emits light required to image the workpieces. In other words, the lighting system 210 emits light to the imaging range of the imaging unit 230. More particularly, the lighting system 210 includes a plurality of lighting control units 211 disposed on a lighting substrate. These units are installed on the lighting substrate. Each of the lighting control units 211 includes a lighting lens 212 and an LED 213. The lighting control units 211 emit light according to a command from the control unit 220. More particularly, the light generated by the LED 213 is emitted to the workpieces via the lighting lens 212.

The imaging unit 230 receives light emitted by the lighting system 210 after the light is reflected and outputs an image signal. This image signal is sent to the control unit 220. More particularly, the imaging unit 230 includes an imaging device 232 divided into a plurality of pixels, such as CCD (Coupled Charged Devices) or CMOS (Complementary Metal Oxide Semiconductors) image sensors in addition to the optical system, including the imaging lens 231.

The control unit 220 controls the overall operation of the image processing apparatus 200. That is, the control unit 220 controls the lighting system 210 and the imaging unit 230 while also performing image processing based on the image signal from the imaging unit 230. More particularly, the control unit 220 includes a processing unit 221, a storage device 222, and a network communication unit 223.

The processing unit 221 is composed of an integrated circuit, such as a CPU 121A and an FPGA 121B. Alternatively, the processing unit 221 may be composed of a different type of integrated circuit, such as a DSP, a GPU, or an ASIC (Application Specific Integrated Circuit).

The storage device 222 may include a non-volatile memory, such as a ROM (Read Only Memory), a flash memory, an HDD, an SSD (Solid State Drive), and/or a volatile memory, such as a RAM (Random Access Memory). Typically, the processing unit 221 performs the various types of image processing of the image processing apparatus 200 by executing a program (instruction codes) 222A stored in the storage device 222.

The network communication unit 223 is an interface for sending and receiving data to and from the management apparatus 100 via the network 2. More particularly, the network communication unit 223 complies with communication standards, such as the Ethernet® standards.

Functional Configuration
Management Apparatus

Figure 4:
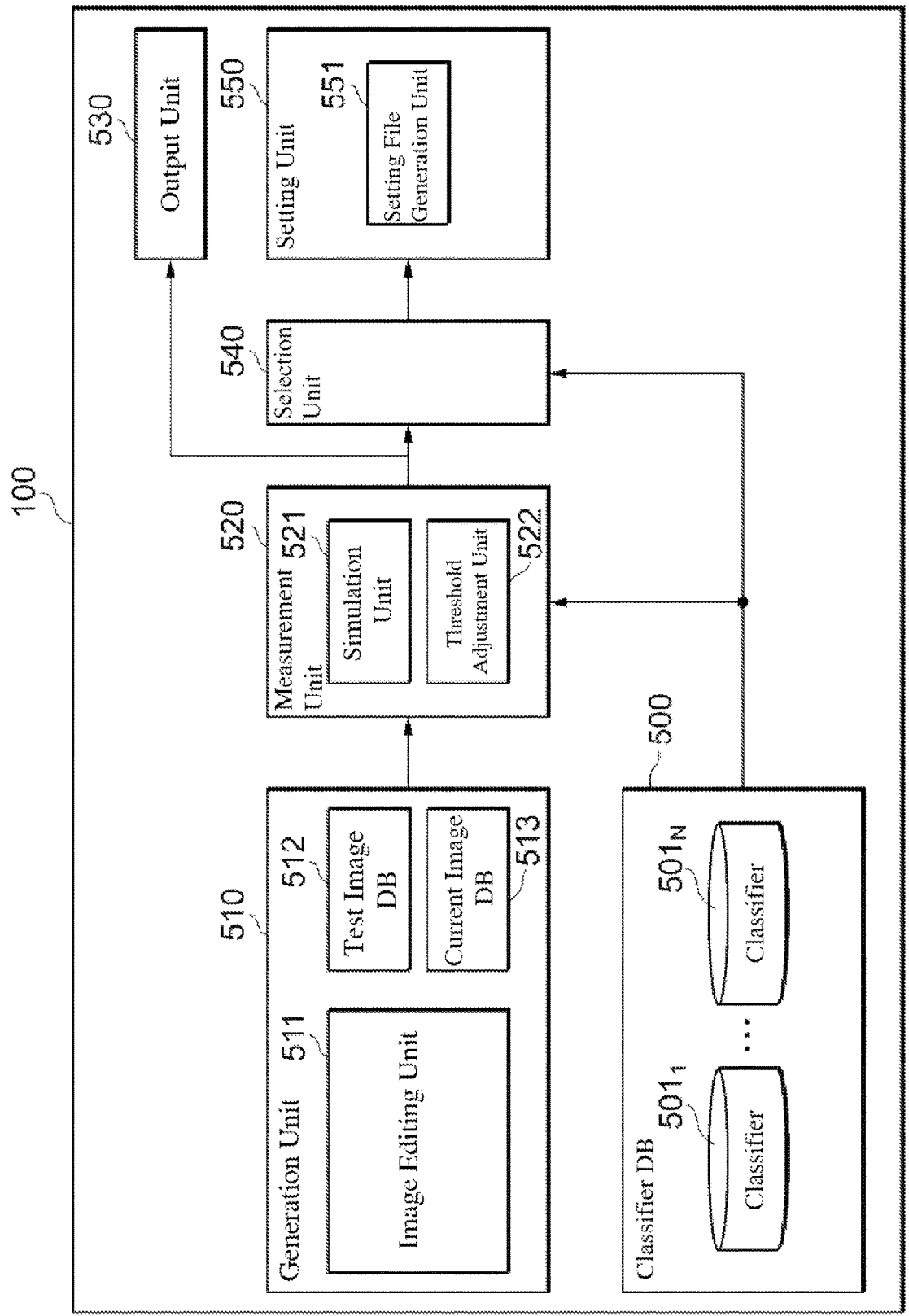
FIG. 4 is a diagram schematically illustrating one example of the functional configuration of a management apparatus according to an embodiment.

Next, one example of the functional configuration of the management apparatus 100 according to an embodiment will be described hereinafter with reference to FIG. 4. FIG. 4 schematically shows one example of the functional configuration of the management apparatus 100 according to an embodiment.

The classifier DB (database) 500 stores a plurality of classifiers with different characteristics and is implemented by the memory 102 or the storage device 103. The memory 102 or the storage device 103 is an example of the storage unit according to an embodiment. In the example of FIG. 4, a plurality of classifiers 5011-501N are illustrated. In the following description, the classifiers 5011-501N are referred generally to classifiers 501 if it is not necessary to make distinctions among the classifiers 5011-501N.

In this example, the classifiers 501 are generated by performing a learning process and an evaluation process with respect to any machine learning model. A machine learning model is a model that has a predetermined model structure and processing parameters that change as a result of a learning process and improves the accuracy of the result of recognition by optimizing its processing parameters based on the experience obtained from learning data. In other words, the classifiers 501 of an embodiment include, more particularly, a so-called learned model, which is a combination of a predetermined model structure and optimized processing parameters. The algorithm of a machine learning model may include, but is not limited to, a support vector machine, logistic regression, and a neural network, for example.

First, the generation unit 510 generates a plurality of test images to measure the identification accuracy of each of the classifiers 5011-501N for a specific object of inspection. The generation unit 510 may generate a test image by adding a defect image specified by the user to a workpiece image. The user may (manually) create a test image by suitably specifying the size and the location of the defect to be added. As used herein, the term "defect image" refers to an image showing, for example, a flaw, uneven color, a smudge, a bruise, a chip, a burr, foreign matter, a thin print spot, or misregistration of printing.

Moreover, the generation unit 510 may automatically generate a test image by adding to a workpiece image a defect image generated based on the parameters specified by the user (i.e., by receiving image editing conditions from the user). The parameters specified by the user include, for example, parameters that indicate the maximum and minimum sizes of the defect, the range of the location to which the defect is to be added, etc. The generation unit 510 may automatically generate a plurality of test images by randomly generating defect images within the ranges of these parameters, and adding them to workpiece images.

More specifically, the generation unit 510 may include an image editing unit 511, a test image DB 512, and a current image DB 513. The test image DB 512 may store a plurality of generated test images and the current image DB 513 may store workpiece images. The image editing unit 511 may acquire a workpiece image from the current image DB 513 and generate a test image by adding a defect image stored in the test image DB 512 to the workpiece image. The test image DB 512 and the current image DB 513 are implemented by the memory 102 or the storage device 103.

The measurement unit 520 measures the identification accuracy and the execution time of each of the classifiers 5011-501N for a specific object of inspection. More specifically, the measurement unit 520 measures the identification accuracy and the execution time of each of the classifiers 5011-501N by causing each classifier to identify the test image.

The selection unit 540 selects, as the classifier 501 to be executed by the image processing apparatus 200, a classifier 501 whose execution time meets a predetermined condition from the classifiers 501 whose identification accuracy measured by the measurement unit 520 falls within a predetermined allowable range. If there is no classifier 501 whose identification accuracy measured by the measurement unit 520 falls within a predetermined allowable range, the selection unit 540 may select the classifier 501 that has the highest identification accuracy as the classifier 501 to be executed by the image processing apparatus 200.

The output unit 530 outputs to the display unit 105 the identification accuracy and the execution time of each of the classifiers 5011-501N measured by the measurement unit 520. The setting unit 550 performs setting to cause the classifier 501 selected by the selection unit 540 to be operated by the image processing apparatus 200. The setting unit 550 also includes a setting file generation unit 551. The setting file generation unit 551 generates in the image processing apparatus 200 a setting file to set the classifier 501 selected to be operated by the image processing apparatus 200. The setting file may include, for example, the model structure and the processing parameters of the selected classifier 501. The setting file generated by the setting file generation unit 551 is transmitted to the image processing unit 200 and executed by the processing unit 221 of the image processing unit 200. This causes the classifier 501 selected by the selection unit 540 of the management unit 100 to be operated in the image processing apparatus 200. Alternatively, classifiers identical to classifiers 5011-501N stored in the classifier DB 500 may be stored in the image processing apparatus 200 in advance while including information that specifies the classifier to be operated in the image processing apparatus 200 in the setting file.

The classifiers 501 according to an embodiment may be classifiers that determine whether or not the object of inspection has a defect by combining a learned model for outputting a value indicating the possibility that an inputted image may include a defect (referred to "similarity" hereinafter) and a threshold value indicating the limit of similarity within which a defect is contained. Additionally, the learned models used in the classifiers 5011-501N may include a plurality of different types of learned models with different performance capabilities. In other words, the classifiers 5011-501N may be classifiers 501 with different identification accuracies depending on the combination of a type of learned model and a threshold value for identifying a defect.

For example, a classifier 501 that has a learned model A and the threshold value set to 90% outputs a result of determination that the inputted image does not contain a defect if a similarity of 85% is outputted from the learned model A, into which the image is inputted. Likewise, a classifier 501 that has the learned model A and the threshold value set to 80% outputs a result of determination that the inputted image contains a defect if a similarity of 85% is outputted from the learned model A, into which the image is inputted. Specific examples of leaned models will be described below.

More specifically, the measurement unit 520 may include a simulation unit 521 and a parameter adjustment unit 522. The simulation unit 521 acquires a result of determination (whether or not a test image contains a defect) by inputting a test image into the classifier 501 for which measurement is performed and measures the identification accuracy of the classifier 501 based on the acquired result of determination. The parameter adjustment unit 522 provides the simulation unit 521 with the threshold value to be set for the classifier 501.

Moreover, the test images may include a plurality of images that should be recognized as containing a defect (referred to as "defective item test images" hereinafter) and a plurality of images that should not be recognized as containing a defect (referred to as "non-defective item test images" hereinafter). The term "defective item test image" refers to a test image generated by adding a defect image that has a size, shape, etc., that should be recognized as defective to a workpiece image. The term "non-defective item test image" refers to a test image generated by adding a defect image that has a size, shape, etc., that should not be recognized as defective (that is, that cannot be deemed defective) to a workpiece image.

In this case, the identification accuracy of the classifier 501 measured by the measurement unit 520 may include a probability that the classifier accurately identifies a defect in a plurality of defective item test images (referred to as "a defect identification rate" hereinafter) and a probability that the classifier erroneously identifies a defect in a plurality of non-defective item test images (referred to as "a false positive rate" hereinafter).

The measurement unit 520 may measure the defect identification rate and the execution time by causing each of the classifiers 5011-501N to identify a plurality of defective item test images, and also measure the false positive rate and the execution time by causing each of the classifiers 5011-501N to identify a plurality of non-defective item test images. Moreover, the selection unit 540 may select, as the classifier 501 to be executed by the image processing apparatus 200, a classifier 501 whose execution time meets a predetermined condition from the classifiers 501 whose defect identification rate and false positive rate measured by the measurement unit 520 fall within predetermined allowable ranges.

In an aspect, a defective item test image is one example of the first test image according to an embodiment. In an aspect, a non-defective item test image is one example of the second test image according to an embodiment. Moreover, the defect identification rate is one example of the first probability according to an embodiment. Moreover, the false positive rate is one example of the second probability according to an embodiment.

Image Processing Apparatus

Figure 5:
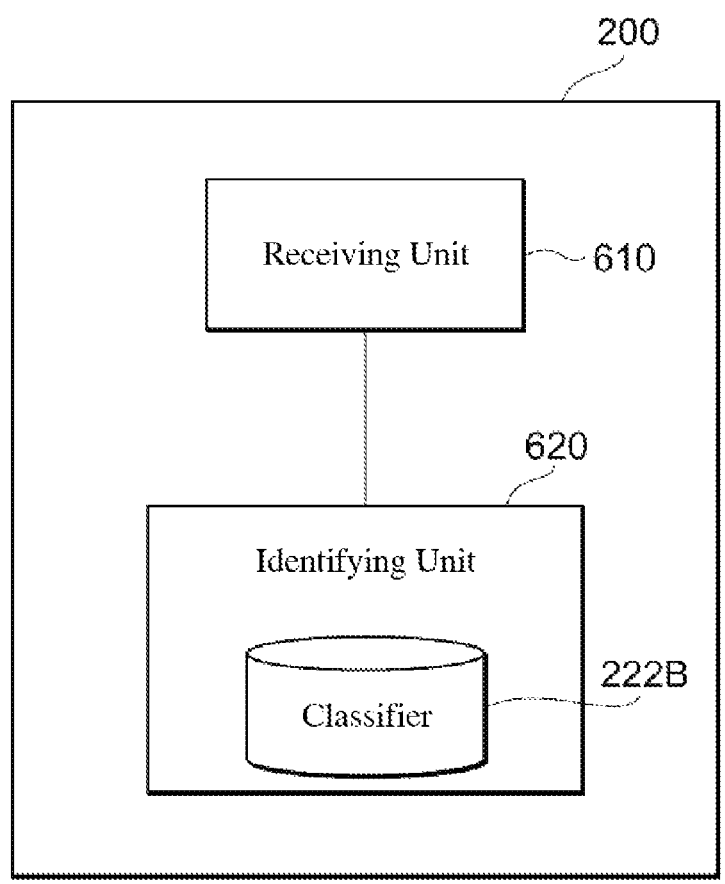
FIG. 5 is a diagram schematically illustrating one example of the functional configuration of an image processing apparatus according to an embodiment.

FIG. 5 schematically shows one example of the functional configuration of the image processing apparatus 200 according to an embodiment. The receiving unit 610 receives from the management apparatus 100 a classifier 501 that has been additionally learned by the management apparatus 100 and stores the classifier as a classifier 222B in the storage device 222. The identifying unit 620 uses the classifier 222B stored in the storage device 222 to determine the presence or absence of a defect in the workpiece imaged by the imaging unit 230. The storage device 222 is one example of the storage unit according to an embodiment.

Other Considerations

According to an embodiment, each of the functions of the management apparatus 100 is implemented by the processor 101. However, part or all of these functions may be implemented by one or more dedicated processors. Furthermore, as for each element of the functional configuration of the management apparatus 100, the function may be omitted or replaced, or an additional feature may be incorporated as appropriate according to the embodiment.

§ 3 Example of Operation

The following describes an example of the operation of the management apparatus 100. It should be noted that the procedure described below is merely an example and that each process may be modified to the extent that it is possible. Additionally, in the procedure described below, steps may be omitted, replaced, or added as appropriate according to an embodiment.

In this exemplary operation, it is assumed that the algorithm of the machine learning model used for the classifiers 501 is a neural network, in particular, a deep neural network (referred to as a "DNN" hereinafter) that has three or more layers. The DNN has an input layer, one or more connected layers (intermediate layers), and an output layer in that order from the input, in which the neurons composing each layer are connected to all the neurons composing the adjacent layers.

Figure 6:
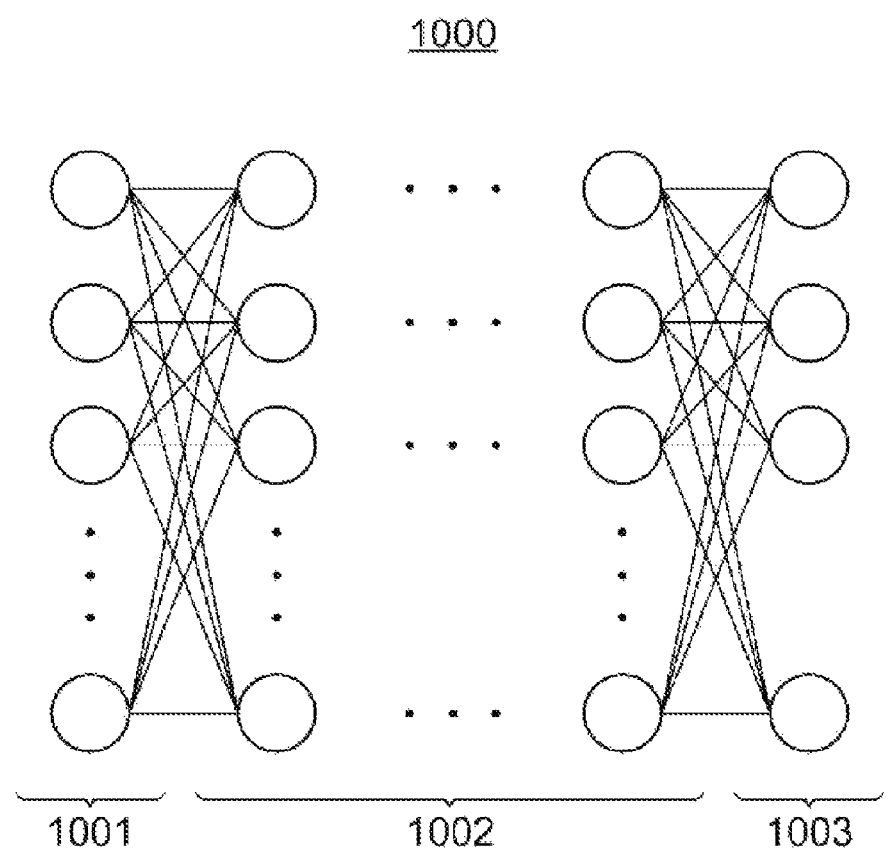
FIG. 6 is a diagram illustrating one example of a neural network.

The following describes the classifier. As shown in FIG. 6, the image processing apparatus 200 according to an embodiment uses a neural network 1000 as a classifier with a learned ability to output a numerical value indicating the possibility that an inputted image contains a defect. The neural network 1000 is a multi-layered neural network used for so-called deep learning and includes an input layer 1001, one or more connected layers (intermediate layers) 1002, and an output layer 1003 in that order from the input.

In FIG. 6, the neural network 1000 includes a plurality of intermediate layers 1002, and the output of the input layer 1001 serves as the input of the intermediate layers 1002 while the output of the intermediate layers 1002 serves as the input of the output layer 1003. Note that the number of the intermediate layers 1002 is not limited to two or more; that is, the neural network 1000 may also have only one intermediate layer 1002.

Each of the layers 1001-1003 has one or more neurons. For example, the number of neurons of the input layer 1001 may be set according to the number of pixels of each captured image inputted to the input layer 1001. The number of neurons of the intermediate layers 1002 may be set as appropriate according to an embodiment. Moreover, the number of neurons of the output layer 1003 may be set as appropriate according to the number of the types of identification for the object of inspection.

The neurons of adjacent layers are connected as appropriate with a weight set for each connection (connection weight). In the example of FIG. 6, each neuron is connected with all the neurons of the adjacent layers. However, the manner in which the neurons are connected need not be limited to this example, but may specified as appropriate according to an embodiment.

A threshold value is set for each neuron and, basically, the output of each neuron is determined depending on whether the sum of a product of each input and each weight exceeds a threshold value. The image processing apparatus 200 identifies an object based on the value that can be obtained from the output layer 1003 by inputting each of the aforementioned captured images into the input layer 1001 of the neural network 1000.

The learned model includes information that indicates this configuration of the neural network 1000 (for example, the number of layers in the neural network 1000, the number of neurons in each layer, the connection relationship among the neurons, the transfer function of each neuron), the connection weight between neurons, a threshold value of each neuron. The image processing apparatus 200 refers to the learned model to perform setting of the learned neural network 1000 used for the process of identification of a desired object.

Overview of Procedure

Figure 7:
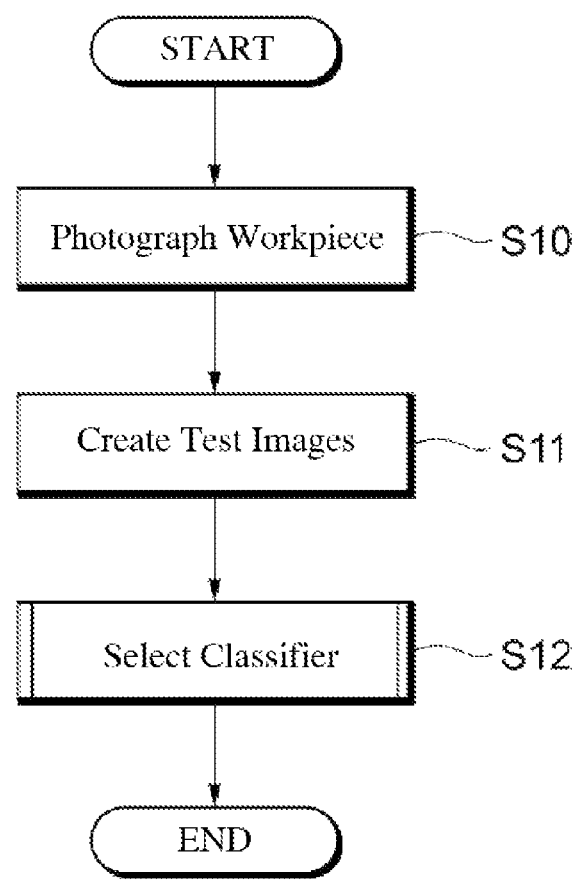
FIG. 7 is a flowchart illustrating one example of the procedure performed by a management apparatus.

FIG. 7 is a flowchart that shows an example of the procedure performed by the management apparatus 100. First, the user photographs a workpiece that has no defect in advance and causes the management apparatus 100 to capture the image of the photographed workpiece. The captured workpiece image is stored in current image DB 513 (S10). The workpiece may be photographed, for example, by using the imaging unit 230 of the image processing apparatus 200.

Subsequently, the generation unit 510 of the management apparatus 100 generates a defective item test image and a non-defective item test image based on the instructions of the user (S11). In particular, the generation unit 510 displays a test image creation screen on the display unit 105 and creates a defective item test image and a non-defective item test image by adding a defect image specified by the user to the workpiece image. The generation unit 510 stores the defective item test image and the non-defective item test image thus created in the test image DB 512.

Next, the measurement unit 520 of the management apparatus 100 reads out a plurality of defective item test images from the test image DB 512 and causes each of the classifiers 5011-501N to identify these defective item test images so as to measure the defect identification rate of each of the classifiers 5011-501N and the execution time of each of the classifiers 5011-501N from when the measurement unit 520 causes each of the classifiers to start detecting whether or not the defective item test images contains a defect to when the classifier outputs the result of the detection. Furthermore, the measurement unit 520 reads out a plurality of non-defective item test images from the test image DB 512 and causes each of the classifiers 5011-501N to identify these non-defective item test images so as to measure the false positive rate of each of the classifiers 5011-501N and the execution time of each of the classifiers 5011-501N from when the measurement unit 520 causes each of the classifiers to start detecting whether or not the non-defective item test images contains a defect to when the classifier outputs the result of the detection. The selection unit 540 selects, as the classifier 501 to be executed by the image processing apparatus 200, the classifier 501 with the shortest execution time from the classifiers 501 whose measured execution time and false positive rate both fall within predetermined allowable ranges (S12). The predetermined allowable range of the defect identification rate is the lower limit of the defect identification rate specified by the user who uses the image processing apparatus 200 (for example, 90% or more), and the predetermined allowable range of the false positive rate is the upper limit of the false positive rate desired by the user (for example, 5% or less).

Creation of Test Images

Figure 8:
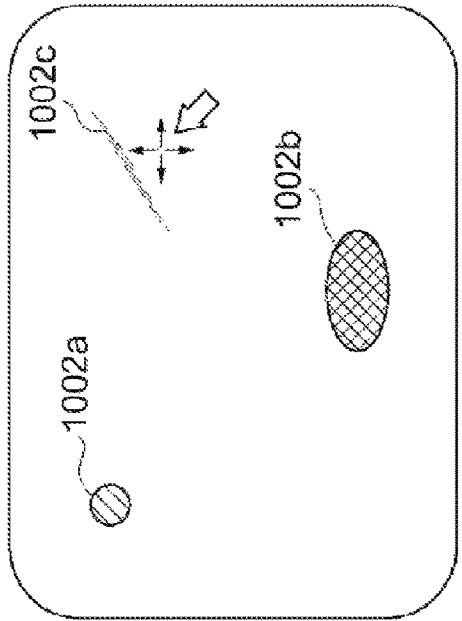
FIG. 8 is a diagram illustrating one example of a test image creation screen (manual).
Figure 10:
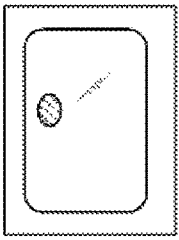
FIG. 10 is a diagram illustrating one exemplary type of learned model.

The following describes the procedure in Step S11 of FIG. 7 in detail by referring to FIGS. 8-10.

FIG. 8 shows one example of a test image creation screen (manual). The test image creation screen (manual) is a screen to allow the user manually to create a test image. The test image creation screen (manual) includes a basic defect setting area 1001 for entering the sizes, the locations, and other attributes of the defect images to be added to the image of a workpiece and a test image display area 1002 to display an image of the workpiece to which defect images are added. The basic defect setting area 1001 includes a selection menu 1001a that allows the user to select whether the test image being created is a defective item test image or a non-defective item test image.

On the test image creation screen (manual), the user can add defect images to any locations on the workpiece image, for example, through mouse and/or touch panel operation. In the example of FIG. 8, the user is adding a bruise 1002a, a smudge 1002b, and a flaw 1002c to the workpiece image. On the test image creation screen (manual), the user can also add defect images to the workpiece image by entering numerical values that indicate the sizes, the locations, and other attributes of the defect images the user desires to add in the basic defect setting area 1001. When the user presses the creation completed button 1003, the generation unit 510 stores in the test image DB the workpiece image shown in the test image display area 1002 to which the defect images added have been added. More specifically, if the "Defective Item Test Image" is selected in the selection menu 1001a, the generation unit 510 stores the workpiece image to which the defect images were added in the test image DB as a defective item test image. On the other hand, if the "Non-Defective Item Test Image" is selected in the selection menu 1001a, the generation unit 510 stores the workpiece image to which the defect images were added in the test image DB as a non-defective item test image.

FIGS. 9-10 show one example of a test image creation screen (automatic). The test image creation screen (automatic) is a screen on which the generation unit 510 automatically creates test images based on the parameters entered by the user. The test image creation screen (automatic) includes a basic defect setting area 2001 for entering the parameters of the defect images to be added to the images of a workpiece and a test image display area 2002 to display images of the workpiece to which defect images are added. FIG. 9 shows a defective item test image being created while FIG. 10 shows both defective item test images and non-defective item test images being created.

In the example of FIG. 9, addition of a flaw having a minimum depth of 10 μm and a minimum length of 1 mm as the parameters of a defect image to be added to the workpiece image in the basic defect setting area 2001 is specified in order to create defective item test images. Additionally, the number of defective item test images is set to ten. Furthermore, the location and the color tone of the flaw are set to arbitrary (auto). In this case, the generation unit 510 creates ten defective item test images to which a flaw having a minimum depth of 10 μm and a minimum length of 1 mm is added to arbitrary locations of the workpiece image.

In the example of FIG. 10, addition of a flaw having a minimum depth of 10 μm and a minimum length of 1 mm as the parameters of a defect image to be added to the workpiece image in the basic defect setting area 2001 is also specified in order to create defective item test images. Moreover, addition of a flaw having a maximum depth of 10 μm and a maximum length of 1 mm as the parameters of a defect image to be added to the workpiece image is specified in order to create non-defective item test images. Additionally, the number of defective item test images is set to six, and the number of non-defective item test images is set to four. In this case, the generation unit 510 creates six defective item test images to which a flaw having a minimum depth of 10 μm and a minimum length of 1 mm is added to arbitrary locations of the workpiece image, and the generation unit 510 creates four non-defective item test images to which a flaw having a maximum depth of 10 μm and a maximum length of 1 mm is added to arbitrary locations of the workpiece image.

Selection of Classifier

The following is a detailed description of the procedure in Step S12 of FIG. 7. The specific types of learned models will be described hereinafter. As described above, the classifiers 5011-501N may be designed by combining a type of learned model and a threshold value for identifying a defect.

FIG. 11 shows examples of various types of learned models. Learned models of Types 1-3 are for performing binary-type (2-bit integer) operations. Learned models of Types 4-6 are for performing integral-type (8-bit integer) operations. Learned models of Types 7-9 are for performing floating point-type (float) operations. Learned models of Types 10-12 are for performing floating point-type (double) operations. Furthermore, learned models of Types 2, 5, 8, and 11 are models in which, for example, less than 70% of the neurons of all the connection layers of Types 1, 4, 7, and 10 of learned models, respectively, are eliminated. Furthermore, learned models of Types 3, 6, 9, and 12 are models in which, for example, at least 70% of the neurons of all the connection layers of Types 1, 4, 7, and 10 of learned models, respectively, are eliminated.

The lower the computational accuracy becomes, the lower the computational amount becomes in the entire learned model, which means that the identification accuracy decreases although the execution time becomes shorter. Likewise, the more neurons are eliminated in the connection layers, the lower the computational amount becomes in the entire learned model, which means that the identification accuracy decreases although the execution time becomes shorter. Moreover, it is preferable to eliminate neurons that exhibit low activation rates during learning.

The types of learned models that can be used are not limited to the examples shown in FIG. 11; for example, learned models that compute 4-bit integers can also be used. Generally, while the minimum operational unit of CPUs is 8 bits, it is possible to perform 4-bit or 2-bit computations if an FPGA or an ASIC is used. Furthermore, learned models in which the neurons of all the connection layers are replaced with averaging filters may also be used. The types of learned models are not limited to the above-described examples; rather, any types of learned models may be used.

Figure 12:
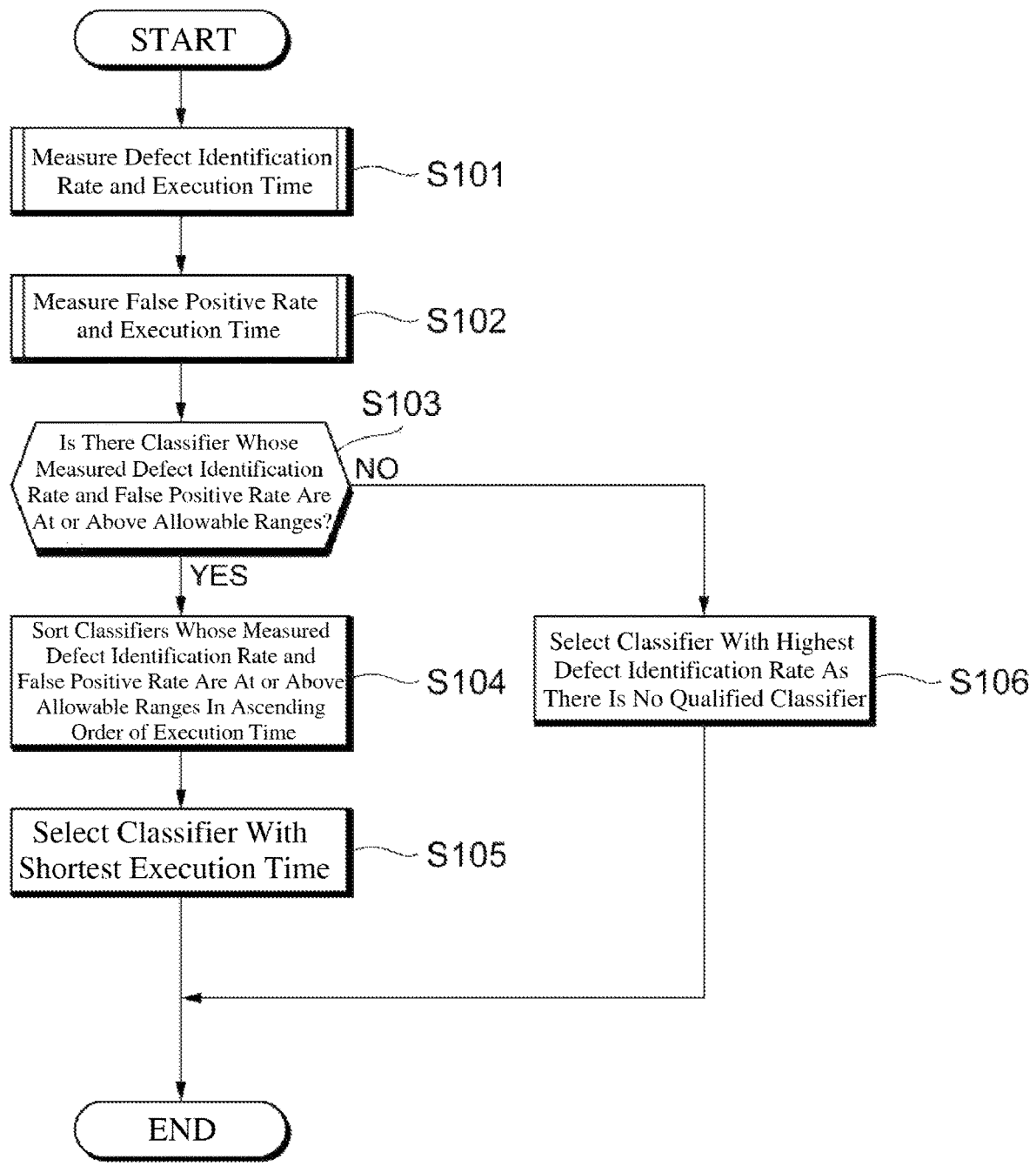
FIG. 12 is a diagram illustrating an example of the procedure performed by a management apparatus to select a classifier.

FIG. 12 is a flowchart that shows an example of the procedure performed by the management apparatus 100 to select a classifier. First, the measurement unit 520 measures the defect identification rate and the execution time of each of the classifiers 5011-501N by causing each classifier to identify a plurality of defective item test images read out from the test image DB 512 (S101). Next, the measurement unit 520 measures the false positive rate and the execution time of each of the classifiers 5011-501N by causing each classifier to identify a plurality of non-defective item test images read out from the test image DB 512 (S102).

Next, the selection unit 540 checks to see if there is any classifier 501 whose measured defect identification rate and false positive rate are at or above the respective predetermined allowable ranges (S103). If there are classifiers 501 whose measured defect identification rate and false positive rate are at or above the respective predetermined allowable ranges, the process proceeds to S104, and if there is not, the process proceeds to S106.

These predetermined allowable ranges are defined by the lower limit of the defect identification rate and the upper limit of the false positive rate set by the user of the image processing apparatus 200. If the user desires a minimum defect identification rate of 90% when inspecting defects on the workpieces conveyed on the production line, the user sets a defect identification rate of at least 90% as the allowable range. Likewise, if the user desires a false positive rate of 10% or less when inspecting defects on the workpieces conveyed on the production line, the user sets a false positive rate of 10% or lower as the allowable range.

Next, the selection unit 540 sorts the classifiers 501 whose measured defect identification rate and false positive rate are at or above the respective predetermined allowable ranges in ascending order of execution time (S104), and the selection unit 540 selects the classifier 501 with the shortest execution time as the classifier to be executed by the image processing apparatus 200 (S105). Alternatively, the selection unit 540 may use the average of the execution time measured in Step S101 and the execution time measured in Step S102 as the execution time used in Step S104.

Even if there is no classifier 501 whose measured defect identification rate and false positive rate are at or above the respective predetermined allowable ranges, the selection unit 540 selects the classifier 501 with the highest defect identification rate (S106).

Figure 13:
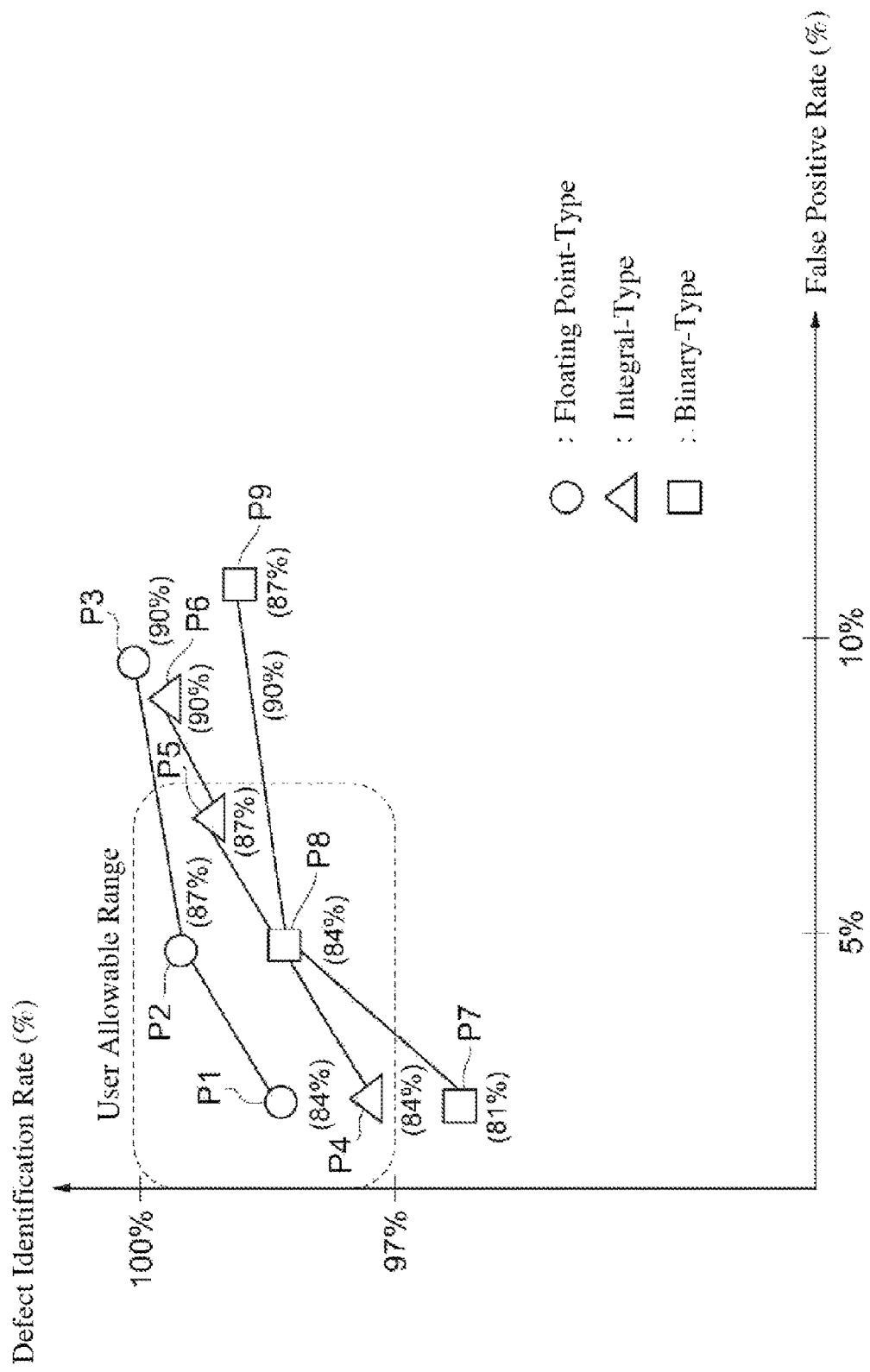
FIG. 13 is a diagram illustrating a specific example of the results of measurement of defect identification rates and false positive rates.

FIG. 13 shows a specific example of the results of measurement of defect identification rates and false positive rates. The vertical axis indicates the defect identification rate, and the lateral axis indicates the false positive rate. P1, P2, and P3 represent examples of the defect identification rate and the false positive rate when 84%, 87%, and 90%, respectively are set as the threshold values with respect to a classifier 501 that has a floating point-type learned model. P4, P5, and P6 represent examples of the defect identification rate and the false positive rate when 84%, 87%, and 90%, respectively are set as the threshold values with respect to a classifier 501 that has an integral-type learned model. P7, P8, and P9 represent examples of the defect identification rate and the false positive rate when 81%, 84%, and 87%, respectively are set as the threshold values with respect to a classifier 501 that has a binary-type learned model. Also, the allowable ranges set by the user are the defect identification rate of 97% or more and the false positive rate of 8% or less. In the example of FIG. 13, the classifiers 501 that corresponds to P1, P2, P4, P5, and P8 are to be selected in Step S103 of FIG. 12.

Figure 14:
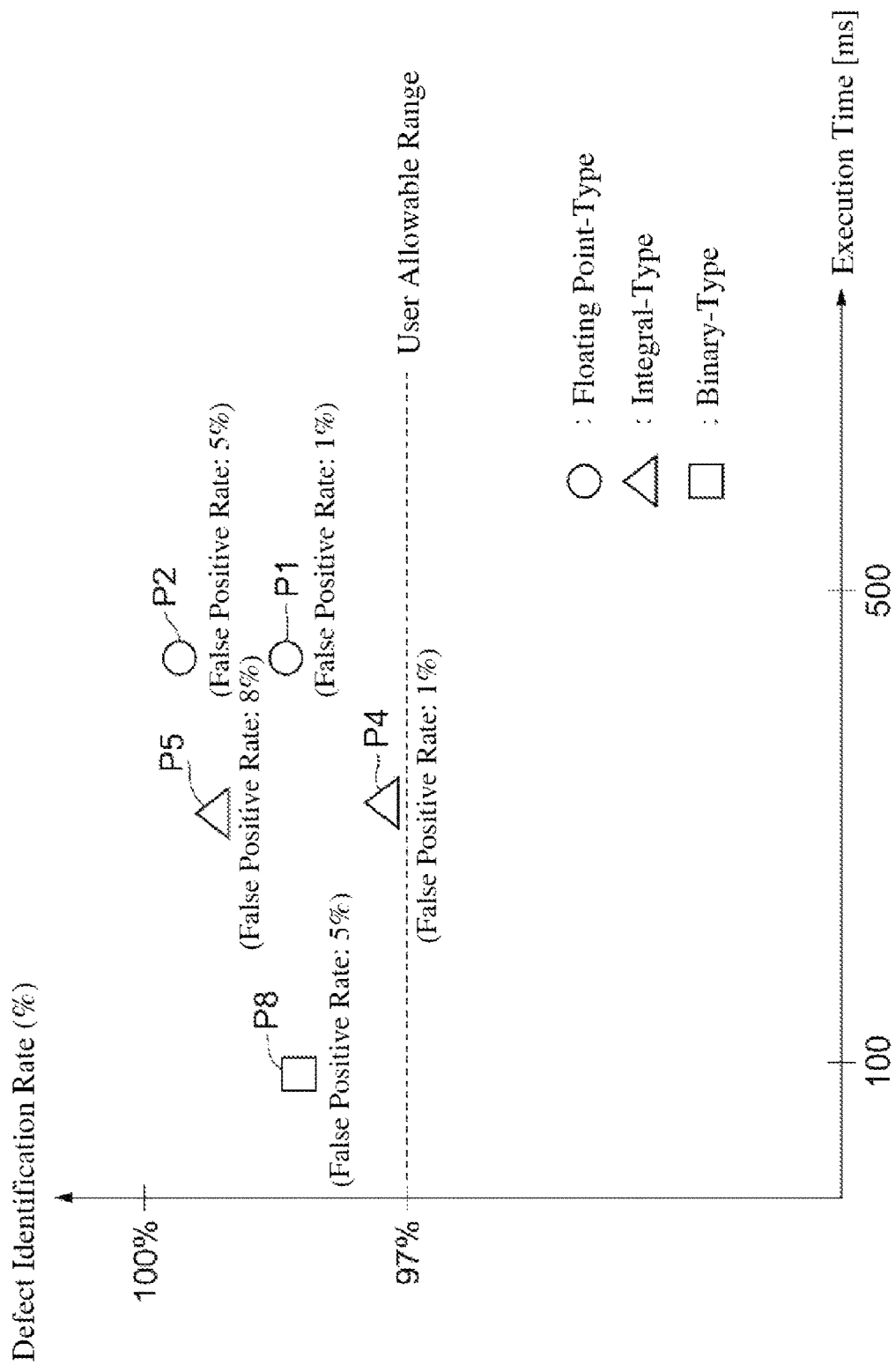
FIG. 14 is a diagram illustrating specific examples of the results of measurement of execution time.

FIG. 14 shows specific examples of the results of measurement of execution time. The vertical axis indicates the defect identification rate, and the lateral axis indicates the execution time. As shown in FIG. 14, among the classifiers 501 corresponding to P1, P2, P4, P5, and P8, the classifier 501 with the shortest execution time is the one that corresponds to P8 (the classifier 501 with a binary-type learned model for which the threshold value of 84% is set). Therefore, in the example of FIG. 14, the classifier 501 for which the threshold is set to 84% is selected in Step S105 of FIG. 12.

Selection of Classifier: Measurement of Defect Identification Rate

Figure 15:
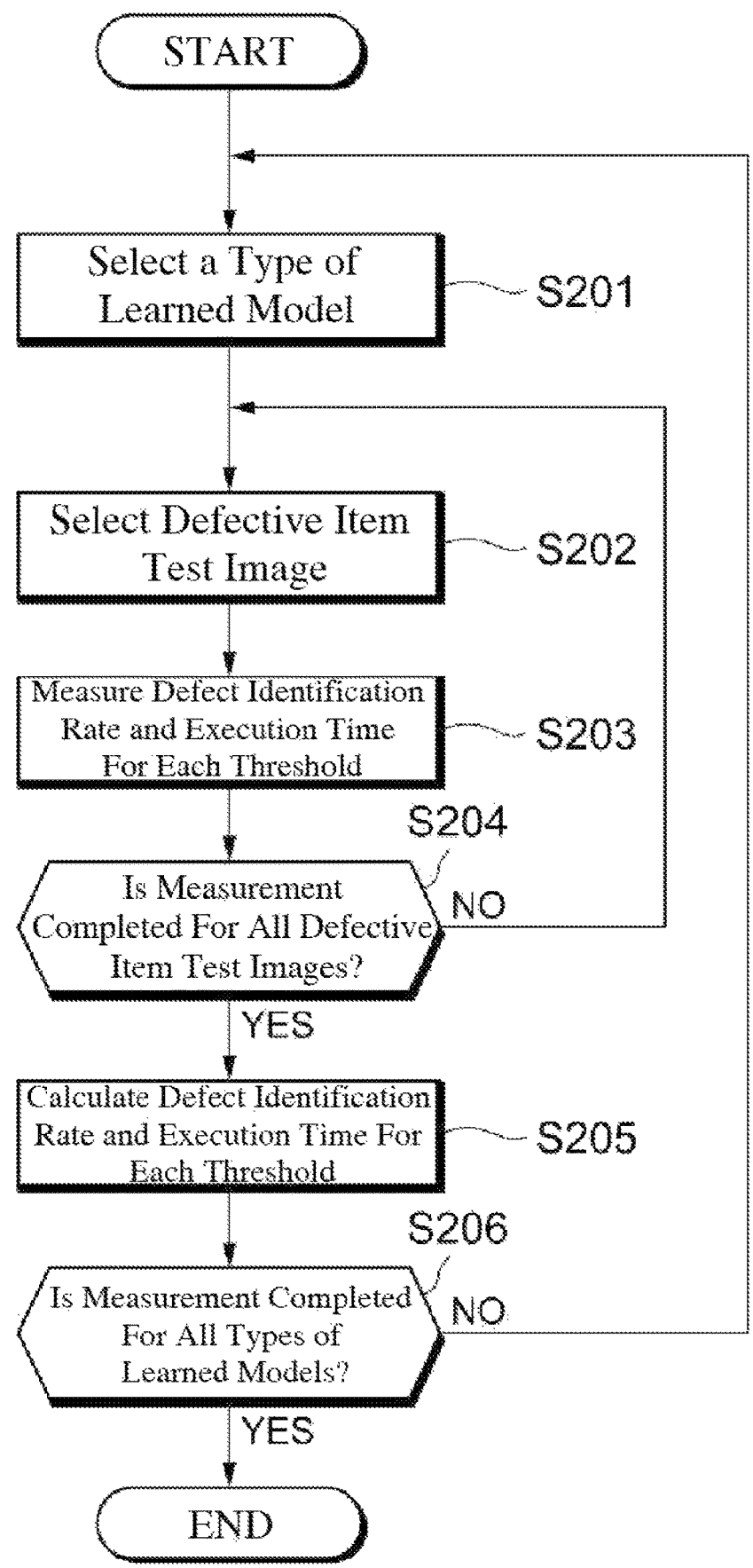
FIG. 15 is a diagram illustrating an example of the procedure performed by a management apparatus to measure defect identification rates.

FIG. 15 is a flowchart that shows an example of the procedure performed by the management apparatus 100 to measure defect identification rates. The following is a detailed description of the procedure in Step S101 of FIG. 12 with reference to FIG. 15.

Initially, the measurement unit 520 selects one of the types of learned models used for the classifiers 5011-501N (S201). Next, the measurement unit 520 selects one of the plurality of defective item test images stored in the test image DB 512 (S202). The measurement unit 520 then sets a threshold value for the classifier 501 having the type of learned model selected in Step S201 and measures the defect identification rate and the execution time by inputting the defective item test image selected in Step S202. The execution time can be measured, for example, by calculating the difference between the time at which the defective item test image is inputted into the classifier 501 and the time at which the result of identification is outputted.

Additionally, by changing the threshold value set for the classifier 501, the measurement unit 520 measures the defect identification rate and the execution time for all the threshold values that can be set for the classifier 501 (S203). The threshold values that can be set for the classifier 501 may include predetermined minimum and maximum values and predetermined increments therebetween, for example, a range from 75% to 97% with increments of 3%.

Next, the measurement unit 520 repeats Steps S202-S203 for the plurality of defective item test images stored in the test image DB 512. The process goes on to Step S205 when the measurement of the defect identification rate and the execution time for each threshold value is completed for all the defective item test images (S204).

The measurement unit 520 calculates the averages of the defect identification rate and the execution time for each threshold value determined by repeating Steps S202-S203 (S205). This determines, for each threshold value, the defect identification rate and the execution time of the classifier 501 with the type of learned model selected in Step S201.

Then, the measurement unit 520 measures the defect identification rate and the execution time of all the types of learned models for each threshold value by repeating Steps S201 to S205 for each of the types of learned models used for the classifiers 5011-501N (S206). The process is terminated once the measurement is completed for all the types of learned models. The foregoing procedure determines the defect identification rate and the execution time of each of the classifiers 5011-501N.

Selection of Classifier: Measurement of False Positive Rate

Figure 16:
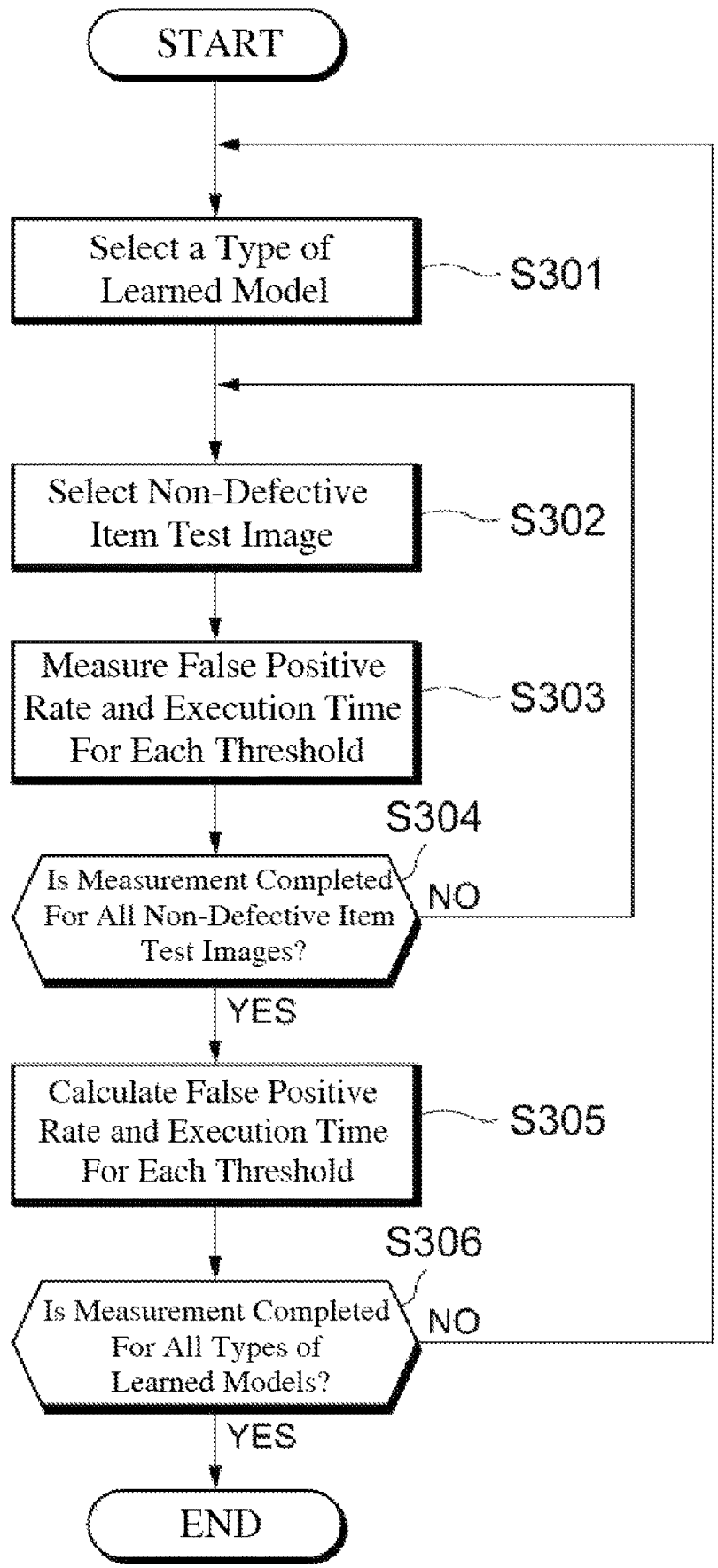
FIG. 16 is a diagram illustrating an example of the procedure performed by a management apparatus to measure false positive rates.

FIG. 16 is a flowchart that shows an example of the procedure performed by the management apparatus 100 to measure false positive rates. The following is a detailed description of the procedure in Step S102 of FIG. 12 with reference to FIG. 16.

The measurement unit 520 selects one of the types of learned models used for the classifiers 5011-501N (S301). Next, the measurement unit 520 selects one of the plurality of non-defective item test images stored in the test image DB 512 (S302). The measurement unit 520 then sets a threshold value for the classifier 501 that has the type of learned model selected in Step S301 and measures the false positive rate and the execution time by inputting the non-defective item test image selected in Step S302. The execution time can be measured, for example, by calculating the difference between the time at which the non-defective item test image is inputted into the classifier 501 and the time at which the result of identification is outputted.

Additionally, by changing the threshold value set for the classifier 501, the measurement unit 520 measures the false positive rate and the execution time for all the threshold values that can be set for the classifier 501 (S303). The threshold values that can be set for the classifier 501 may include predetermined minimum and maximum values and predetermined increments therebetween, for example, a range from 0% to 10% with increments of 1%.

Next, the measurement unit 520 repeats Steps S302-S303 for the plurality of non-defective item test images stored in the test image DB 512. The process goes on to Step S305 when the measurement of the false positive rate and the execution time for each threshold value is completed for all the non-defective item test images (S304).

The measurement unit 520 calculates the averages of the false positive rate and the execution time determined for each threshold value by repeating Steps S302-S303 (S305). This determines, for each threshold value, the false positive rate and the execution time of the classifier 501 that has the type of learned model selected in Step S301.

Then, the measurement unit 520 measures the false positive rate and the execution time of all the types of learned models for each threshold value by repeating Steps S301 to S305 for each of the types of learned models used for the classifiers 5011-501N (S306). The process is terminated once the measurement is completed for all the types of learned models. The foregoing procedure determines the false positive rate and the execution time of each of the classifiers 5011-501N.

§ 4 Variations

The classifiers 5011-501N may be classifiers specialized for the same specific object of inspection. FIG. 17 shows examples of the types of objects of inspection identified by the classifiers. For example, each of the classifiers 5011-501N may be a classifier 501 that is specialized for the same specific object of inspection determined by a combination of all or part of plurality of attributes (the material of the workpiece, the surface texture of the workpiece, the type of defect to be detected, and the size of the defect that can be detected, etc., in the case of the examples of FIG. 17). Each of the classifiers 5011-501N may be designed by a different type of leaned model.

Moreover, the classifiers 5011-501N may also comprise sets of classifiers specialized for different objects of inspection. Specifically, the classifiers 5011-501N may comprise sets of classifiers specialized for various items for inspection, for example: classifiers 5011-501A specialized to identify a workpiece for inspection made of metal and having a shiny surface texture and a flaw having a minimum depth of 100 μm; classifiers 501A+1-501B specialized to identify a workpiece for inspection made of metal and having a shiny surface texture and a smudge; and classifiers 501B+1-501N specialized to identify a workpiece for inspection made of metal and having a rough surface texture and a bruise. Moreover, each of the classifiers 5011-501A may be designed by a different type of leaned model. Similarly, each of the classifiersA+1-501B may be designed by a different type of leaned model. Each of the classifiers 501B+1-501N may be designed by a different type of leaned model.

The management apparatus 100 may select the optimum classifier 501 for each inspection item and set the selected classifiers for the different image processing apparatuses 200. In this way, each of the plurality of image processing apparatuses 200 installed on a production line can identify a different inspection item of the workpieces conveyed on the production line, thus constructing an image processing system 1 with enhanced identification accuracy.

An embodiment has been described above. According to an embodiment, among the plurality of classifiers 501 for workpiece inspection whose measured identification accuracy falls within a predetermined allowable range, a classifier whose execution time meets a predetermined condition can be selected to be executed by the image processing apparatus 200. This makes it possible to provide a classifier that meets the user's needs in terms of identification accuracy and execution time.

Furthermore, for example, a company that supplies the image processing system 1 may provide a user with the system with a plurality of classifiers 501 incorporated therein (i.e., preset) so that the user can operate the management apparatus 100 to select a classifier that has identification accuracy and execution time that meet their own needs.

Having thus described embodiments in detail, the foregoing description merely illustrates the present invention in all aspects. It goes without saying that various modifications and changes may be made without departing from the scope of the present invention.

Appendix 1

An information processing apparatus (100) comprising:
a storage unit (102, 103) configured to store a plurality of classifiers (501) that identify an object, the classifiers (501) having different characteristics;
a measurement unit (520) configured to measure identification accuracy and execution time of each of the plurality of classifiers (501) for a specific object;
an output unit (530) configured to output the identification accuracy and the execution time of each of the plurality of classifiers (501);
a selection unit (540) configured to select a classifier (501) whose execution time meets a second condition from the classifiers (501) whose identification accuracy measured by the measurement unit (520) meets a first condition; and a setting unit (550) configured to perform setting to cause the selected classifier (501) to operate on an identification apparatus (200).

Appendix 2

The information processing apparatus according to Appendix 1, wherein the storage unit (102, 103) is configured to store test images used to measure the identification accuracy and the execution time of each of the plurality of classifiers (501) for the specific object; and wherein the measurement unit (520) is configured to measure the identification accuracy and the execution time of each of the classifiers (501) by causing each of the plurality of classifiers (501) to identify the test images.

Appendix 3

The information processing apparatus according to Appendix 2, wherein the storage unit (102, 103) is configured to store an image of an object, and wherein the information processing apparatus further comprises a generation unit configured to generate the test images by receiving inputs about image editing conditions from a user and editing images of an object stored in the storage unit (102, 103) based on the editing conditions.

Appendix 4

The information processing apparatus according to Appendix 3, wherein the generation unit is configured to generate the test images by adding images of an object of detection specified by the user to images of an object stored in the storage unit (102, 103).

Appendix 5

The information processing apparatus according to Appendix 3, wherein the generation unit is configured to generate the test images by adding images of an object of detection generated based on parameters specified by the user to images of an object stored in the storage unit (102, 103).

Appendix 6

The information processing apparatus according to any one of Appendices 2-5, wherein the test images include a plurality of first images, a correct answer about each of the first test images being that the first test image contains an object of detection;

wherein the identification accuracy includes a first probability that the respective classifier (501) identifies an object of detection in the plurality of first test images;

wherein the measurement unit (520) is configured to measure the first probability by causing each of the plurality of classifiers (501) to identify the plurality of first test images; and wherein the selection unit (540) is configured to select a classifier (501) whose execution time meets the second condition from the classifiers (501) whose first probability measured by the measurement unit (520) falls under the first condition.

Appendix 7

The information processing apparatus according to Appendix 6, wherein the test images further include a plurality of second images, a correct answer about each of the second test images being that the second test image contains no object of detection;

wherein the identification accuracy further includes a second probability that the respective classifier (501) erroneously identifies an object of detection in the plurality of second test images;

wherein the measurement unit (520) is further configured to measure the second probability by causing each of the plurality of classifiers (501) to identify the plurality of second test images; and wherein the selection unit (540) is configured to select a classifier (501) whose execution time meets the second condition from the classifiers (501) whose second probability measured by the measurement unit (520) falls under the first condition.

Appendix 8

The information processing apparatus according to any of Appendices 1-7, wherein the first condition is a range of identification accuracy specified by the user using the identification apparatus.

Appendix 9

The information processing apparatus according to any of Appendices 1-8, wherein the selection unit (540) is configured to select the classifier (501) that has the highest identification accuracy if there is no classifier (501) whose identification accuracy measured by the measurement unit (520) falls under the first condition.

Appendix 10

The information processing apparatus according to any of Appendices 1-9, wherein each of the plurality of classifiers (501) is designed by combining a type of learned model and a threshold value for identifying an object of detection.

Appendix 11

The information processing apparatus according to any of Appendices 1-10, wherein the classifier (501) whose execution time meets the second condition is the classifier (501) with the shortest execution time.

Appendix 12

An identification system (1) that includes the information processing apparatus (100) and the identification apparatus (200) in communication with the information processing apparatus (100) according to any of Appendices 1-11;

wherein the identification apparatus (200) comprises:

a receiving unit (610) configured to receive a classifier (501) selected by the information processing apparatus (100) from the information processing apparatus (100) and storing the classifier in a storage unit (222); and an identifying unit (620) configured to use a classifier (222B) stored in the storage unit (222) to identify an object.

Appendix 13

A setting method performed by an information processing apparatus (100) comprising a storage unit (102, 103) configured to store a plurality of classifiers (501) that identify an object, the classifiers (501) having different characteristics, the setting method comprising the steps of:

measuring identification accuracy and execution time of each of the plurality of classifiers (501) for a specific object;

outputting the identification accuracy and the execution time of each of the plurality of classifiers (501);

selecting a classifier (501) whose execution time meets a second condition from the classifiers (501) whose measured identification accuracy meets a first condition; and performing setting to cause the selected classifier (501) to operate on an identification apparatus.

Appendix 14

A program for causing a computer (100) to function as:

a storage unit (102, 103) configured to store a plurality of classifiers (501) that identify an object, the classifiers (501) having different characteristics;

a measurement unit (520) configured to measure identification accuracy and execution time of each of the plurality of classifiers (501) for a specific object;

an output unit (530) configured to output the identification accuracy and the execution time of each of the plurality of classifiers (501);

a selection unit (540) configured to select a classifier (501) whose execution time meets a second condition from the classifiers (501) whose identification accuracy measured by the measurement unit (520) meets a first condition; and a setting unit (550) configured to perform setting to cause the selected classifier (501) to operate on an identification apparatus.

The invention claimed is:

1. An information processing apparatus comprising:
a memory storing a plurality of classifiers each comprising a learned model capable of identifying an object of detection, the classifiers having different characteristics; and
a processor configured with a program to perform operations comprising:
operation as a measurement unit configured to measure an identification accuracy and an execution time of each of the plurality of classifiers for identifying the object of detection in a specific object of inspection;
operation as an output unit configured to output the identification accuracy and the execution time of each of the plurality of classifiers;
operation as a selection unit configured to select, from the ones of the plurality of classifiers for which the measured identification accuracy meets a first condition, a classifier for which the measured execution time meets a second condition; and
operation as a setting unit configured to perform setting to cause the selected classifier to operate on an identification apparatus.

2. The information processing apparatus according to claim 1, wherein
the memory stores test images used to measure the identification accuracy and the execution time of each of the plurality of classifiers for identifying the object of detection in the specific object of inspection; and
the processor is configured with the program to perform operations such that operation as the measurement unit comprises measuring the identification accuracy and the execution time of each of the plurality of classifiers by causing each of the plurality of classifiers to identify the object of detection in the stored test images.

3. The information processing apparatus according to claim 2, wherein
the memory stores an image of an object of inspection, and
the processor is configured with the program to perform operations further comprising operation as a generation unit configured to generate the test images by receiving user inputs about image editing conditions and editing images of the image of the object of inspection stored in the storage unit based on the editing conditions.

4. The information processing apparatus according to claim 3, wherein the processor is configured with the program to perform operations such that operation as the generation unit comprises generating the test images by adding user specified images of an object of detection to the edited images of the image of the object of inspection stored in the storage unit.

5. The information processing apparatus according to claim 3, wherein the processor is configured with the program to perform operations such that operation as the generation unit comprises generating the test images by adding user specified images of an object of detection generated based on parameters to the edited images of the image of the object of inspection stored in the storage unit.

6. The information processing apparatus according to claim 2, wherein
the test images include a plurality of first test images configured such that a correct detection result of a respective classifier of the plurality of classifiers regarding each of the first test images is that the respective first test image contains the object of detection;
the identification accuracy includes a first probability that the respective classifier identifies the object of detection in the plurality of first test images; and
the processor is configured with the program to perform operations such that:
operation as the measurement unit comprises measuring the first probability by causing each of the plurality of classifiers to identify the object of detection in the plurality of first test images; and
operation as the selection unit comprises selecting a classifier of the plurality of classifiers whose execution time meets the second condition from ones of the plurality of classifiers whose first probability measured by the measurement unit falls under the first condition.

7. The information processing apparatus according to claim 6, wherein the test images further include a plurality of second test images configured such that a correct detection result of a respective classifier of the plurality of classifiers regarding each of the second test images is that the respective second test image does not contain an object of detection;
the identification accuracy further includes a second probability that the respective classifier erroneously identifies the object of detection in the plurality of second test images; and
the processor is configured with the program to perform operations such that:
operation as the measurement unit comprises measuring the second probability by causing each of the plurality of classifiers to identify the object of detection in the plurality of second test images; and
operation as the selection unit comprises selecting, from ones of the plurality of classifiers whose second probability measured by the measurement unit falls under the first condition, a classifier whose execution time meets the second condition.

8. The information processing apparatus according to claim 1, wherein the first condition is a range of identification accuracy specified by a user using the identification apparatus.

9. The information processing apparatus according to claim 1, wherein the processor is configured with the program to perform operations such that operation as the selection unit comprises selecting the classifier that has a highest identification accuracy in response to none of the plurality of classifiers having an identification accuracy measured by the measurement unit that falls under the first condition.

10. The information processing apparatus according to claim 1, wherein each of the plurality of classifiers comprises a combination of a type of learned model and a threshold value for identifying the object of detection.

11. The information processing apparatus according to claim 1, wherein a classifier of the plurality of classifiers having a shortest execution time meets the second condition.

12. The information processing apparatus according to claim 3, wherein the test images include a plurality of first test images configured such that a correct detection result of a respective classifier of the plurality of classifiers regarding each of the first test images is that the first test image contains the object of detection;
the identification accuracy includes a first probability that the respective classifier identifies the object of detection in the plurality of first test images; and
the processor is configured with the program to perform operations such that:
operation as the measurement unit comprises measuring the first probability by causing each of the plurality of classifiers to identify the object of detection in the plurality of first test images; and
operation as the selection unit comprises selecting a classifier of the plurality of classifiers whose execution time meets the second condition from ones of the plurality of classifiers whose first probability measured by the measurement unit falls under the first condition.

13. The information processing apparatus according to claim 4, wherein the test images include a plurality of first test images configured such that a correct detection result of a respective classifier of the plurality of classifiers regarding each of the first test images is that the first test image contains the object of detection;
wherein the identification accuracy includes a first probability that the respective classifier identifies the object of detection in the plurality of first test images; and
the processor is configured with the program to perform operations such that:
operation as the measurement unit comprises measuring the first probability by causing each of the plurality of classifiers to identify the object of detection in the plurality of first test images; and
operation as the selection unit comprises selecting a classifier of the plurality of classifiers whose execution time meets the second condition from ones of the plurality of classifiers whose first probability measured by the measurement unit falls under the first condition.

14. The information processing apparatus according to claim 5, wherein the test images include a plurality of first test images configured such that a correct detection result of a respective classifier of the plurality of classifiers regarding each of the first test images is that the first test image contains the object of detection;
the identification accuracy includes a first probability that the respective classifier identifies the object of detection in the plurality of first test images; and
the processor is configured with the program to perform operations such that:
operation as the measurement unit comprises measuring the first probability by causing each of the plurality of classifiers to identify the object of detection in the plurality of first test images; and
operation as the selection unit comprises selecting a classifier of the plurality of classifiers whose execution time meets the second condition from ones of the plurality of classifiers whose first probability measured by the measurement unit falls under the first condition.

15. An identification system comprising the information processing apparatus according to claim 1, and an identification apparatus in communication with the information processing apparatus;
wherein the identification apparatus comprises a second processor configured to perform operations comprising operations as:
a receiving unit receiving a classifier selected by the information processing apparatus from the information processing apparatus and storing the classifier in an identification apparatus memory; and
an identifying unit using the classifier stored in the identification apparatus memory to identify the object of detection.

16. A setting method performed by an information processing apparatus comprising a storage unit configured to store a plurality of classifiers each comprising a learned model capable of identifying an object of detection, the classifiers having different characteristics, the setting method comprising:
measuring identification accuracy and execution time of each of the plurality of classifiers for identifying the object of detection in a specific object of inspection;
outputting the identification accuracy and the execution time of each of the plurality of classifiers;
selecting from ones of the plurality of the classifiers whose measured identification accuracy meets a first condition, a classifier whose execution time meets a second condition; and
performing setting to cause the selected classifier to operate on an identification apparatus.

17. A non-transitory computer-readable storage medium storing a program, when read and executed, causing a computer to perform operations comprising:
storing in a memory a plurality of classifiers each comprising a learned model capable of identifying an object of detection, the classifiers having different characteristics;
measuring identification accuracy and execution time of each of the plurality of classifiers for identifying the object of detection in a specific object of inspection;
outputting the identification accuracy and the execution time of each of the plurality of classifiers;
selecting, from ones of the plurality of the classifiers whose identification accuracy measured by the measurement unit meets a first condition, a classifier whose execution time meets a second condition; and
performing setting to cause the selected classifier to operate on an identification apparatus.

* * * * *